US011610108B2

(12) United States Patent
Fukuda et al.

(10) Patent No.: US 11,610,108 B2
(45) Date of Patent: Mar. 21, 2023

(54) TRAINING OF STUDENT NEURAL NETWORK WITH SWITCHED TEACHER NEURAL NETWORKS

(71) Applicant: INTERNATIONAL BUSINESS MACHINES CORPORATION, Armonk, NY (US)

(72) Inventors: Takashi Fukuda, Yokohama (JP); Masayuki Suzuki, Tokyo (JP); Osamu Ichikawa, Yokohama (JP); Gakuto Kurata, Tokyo (JP); Samuel Thomas, Elmsford, NY (US); Bhuvana Ramabhadran, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1146 days.

(21) Appl. No.: 16/047,287

(22) Filed: Jul. 27, 2018

(65) Prior Publication Data
US 2020/0034702 A1    Jan. 30, 2020

(51) Int. Cl.
*G06N 3/08*    (2006.01)
*G06N 3/04*    (2023.01)

(52) U.S. Cl.
CPC ............ *G06N 3/08* (2013.01); *G06N 3/0454* (2013.01)

(58) Field of Classification Search
CPC ......... G06N 3/08; G06N 3/0454; G06N 20/00
See application file for complete search history.

(56) References Cited

U.S. PATENT DOCUMENTS

| | | | |
|---|---|---|---|
| 2015/0340034 A1* | 11/2015 | Schalkwyk | G10L 15/18 704/235 |
| 2016/0078339 A1 | 3/2016 | Li et al. | |
| 2017/0083829 A1* | 3/2017 | Kang | G06N 3/0454 |
| 2017/0132528 A1* | 5/2017 | Aslan | G06N 20/00 |
| 2018/0158552 A1 | 6/2018 | Liu et al. | |
| 2018/0365564 A1* | 12/2018 | Huang | G06N 3/04 |
| 2019/0034764 A1* | 1/2019 | Oh | G06K 9/6257 |
| 2019/0304437 A1* | 10/2019 | Qian | G10L 15/063 |

OTHER PUBLICATIONS

Dong et al., "Multi-Task Curriculum Transfer Deep Learning of Clothing Attributes", 2017, 2017 IEEE Winter Conference on Applications of Computer Vision, pp. 520-529. (Year: 2017).*
Chebotar, Yevgen, et al. "Distilling Knowledge from Ensembles of Neural Networks for Speech Recognition." Interspeech, Sep. 2016, pp. 3439-3443.
Markov, Konstantin, et al. "Robust Speech Recognition Using Generalized Distillation Framework." Interspeech, Sep. 2016, pp. 2364-2368.

(Continued)

*Primary Examiner* — Ying Yu Chen
(74) *Attorney, Agent, or Firm* — Tutunjian & Bitetto, P.C.; Randy Emilio Tejeda (57) ABSTRACT

A student neural network may be trained by a computer-implemented method, including: selecting a teacher neural network among a plurality of teacher neural networks, inputting an input data to the selected teacher neural network to obtain a soft label output generated by the selected teacher neural network, and training a student neural network with at least the input data and the soft label output from the selected teacher neural network.

14 Claims, 5 Drawing Sheets

(56) References Cited

OTHER PUBLICATIONS

Grace Period Disclosure—Fukuda, Takashi, et al. "Efficient Knowledge Distillation from an Ensemble of Teachers." Proc. Interspeech 2017, Aug. 2017, pp. 3697-3701.

Yu, Dong, et al. "Recent progresses in deep learning based acoustic models." IEEE/CAA Journal of Automatica Sinica, Jul. 2017, pp. 396-409, 4(3).

Wong, Jeremy HM, et al. "Sequence student-teacher training of deep neural networks." Interspeech, Sep. 2016, pp. 2761-2765.

Grace Period Disclosure—Fukuda, Takashi, et al. "Knowledge Distillation from a Group of Broadband Neural Network Acoustic Models to a Narrowband Acoustic Model." 120th Audio Language Information Processing Conference and 118th Music Information Science Conference, Feb. 2018.

Office Action issued in corresponding U.S. Appl. No. 16/047,526 dated May 10, 2022, 32 pgs.

Shin et al., "Generative knowledge transfer for neural language models", arXiv preprint arXiv:1608.04077, Aug. 2016, pp. 1-10.

\* cited by examiner

TRAINING OF STUDENT NEURAL NETWORK WITH SWITCHED TEACHER NEURAL NETWORKS

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURE(S)

[Efficient Knowledge Distillation from an Ensemble of Teachers, Takashi Fukuda, Masayuki Suzuki, Gakuto Kurata, Samuel Thomas, Jia Cui, Bhuvana Ramabhadran, Aug. 20-24, 2017, INTERSPEECH 2017, P. 3697-3701]; and

[Knowledge Distillation from a Group of Broadband Neural Network Acoustic Models to a Narrowband Acoustic Model, Takashi Fukuda, Masayuki Suzuki, Gakuto Kurata, Samuel Thomas, Bhuvana Ramabhadran, 9:00-10:50 AM Feb. 21, 2018, 120-th Audio Language Information Processing Conference and 118-th Music Information Science Conference].

BACKGROUND

Technical Field

The present invention relates to training a student neural network with switched teacher neural networks.

Description of the Related Art

Knowledge distillation techniques (also known as "student-teacher training") have recently been investigated to make product level neural networks. In the knowledge distillation framework, a student neural network is trained with soft target outputs from powerful teacher neural networks, rather than hard targets. However, conventional techniques require tuning of interpolation weights for combining the teacher neural networks, which may eventually consume enormous computational resources due to a large number of combinations.

SUMMARY

According to an aspect of the present invention, a computer-implemented method is provided, including: selecting a teacher neural network among a plurality of teacher neural networks, inputting at least an input data to the selected teacher neural network to obtain a soft label output output from the selected teacher neural network, and training a student neural network with at least the input data and the soft label output output from the selected teacher neural network.

The foregoing aspect may also include an apparatus configured to perform the computer-implemented method, and a computer program product storing instructions embodied on a computer-readable medium or programmable circuitry, that, when executed by a processor or the programmable circuitry, cause the processor or the programmable circuitry to perform the computer-implemented method. The summary clause does not necessarily describe all features of the embodiments of the present invention. Embodiments of the present invention may also include sub-combinations of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
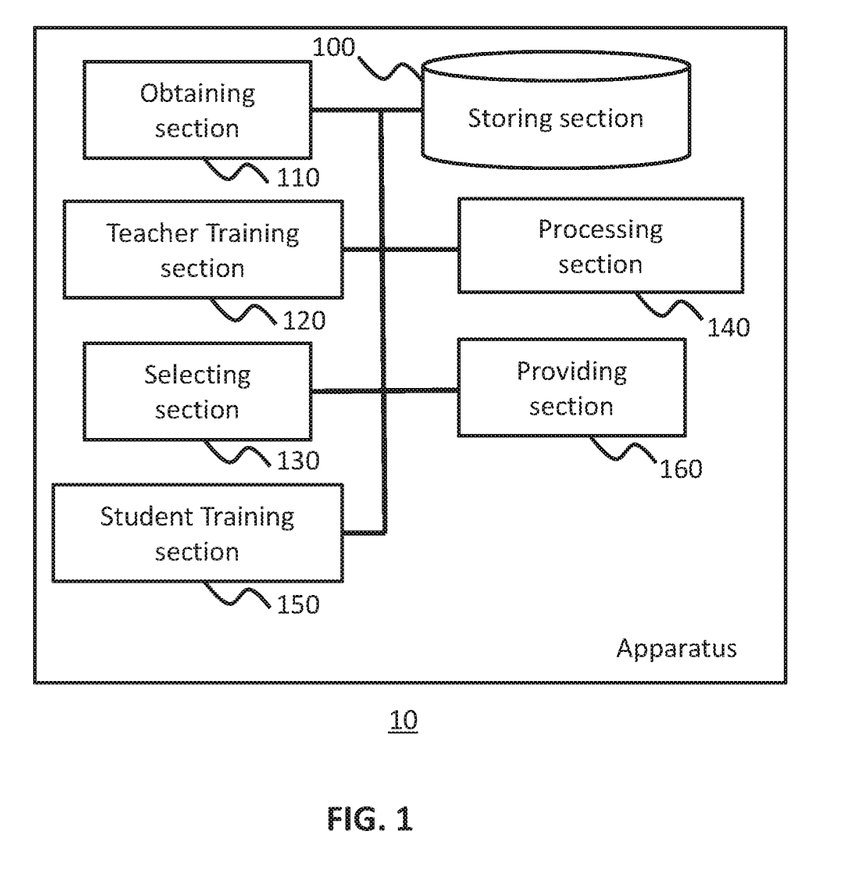
FIG. 1 shows an exemplary configuration of an apparatus 10 according to an embodiment of the present invention.

FIG. 1 shows an exemplary configuration of an apparatus 10, according to an embodiment of the present invention. The apparatus 10 may train a student neural network using soft label outputs that are output from teacher neural networks. In particular, the apparatus 10 may repeatedly select a teacher neural network used for training from among the plurality of teacher neural networks.

The apparatus 10 may include a processor and/or programmable circuitry. The apparatus 10 may further include one or more computer-readable mediums collectively including instructions. The instructions may be embodied on the computer-readable medium and/or the programmable circuitry. The instructions, when executed by the processor or the programmable circuitry, may cause the processor or the programmable circuitry to operate as a plurality of operating sections.

Thereby, the apparatus 10 may be regarded as including a storing section 100, an obtaining section 110, a teacher training section 120, a selecting section 130, a processing section 140, a student training section 150, and a providing section 160. In some embodiments, the apparatus 10 may be implemented by two or more computers as later explained in relation to FIG. 5.

The storing section 100 may store information used for the processing that the apparatus 10 performs. The storing section 100 may also store a variety of data/instructions used for operation of the apparatus 10. One or more other elements in the apparatus 10 (e.g., the obtaining section 110, the teacher training section 120, the selecting section 130, the processing section 140, the student training section 150, and the providing section 160) may communicate data directly or via the storing section 100, as necessary.

The storing section 100 may be implemented by a volatile or non-volatile memory of the apparatus 10. In some embodiments, the storing section 100 may store training data, test data, teacher input data, student and/or teacher neural networks, parameters and other data related thereto.

The obtaining section 110 may obtain at least one of training data, test data, a plurality of teacher input data, and parameters relating to teacher or student neural networks. The training data may be used for training a plurality of teacher neural networks. The training data may include a plurality of pairs of a training input data and a correct training data corresponding to the training input data.

The test data may be used to evaluate the plurality of teacher neural networks. The test data may include a plurality of pairs of test input data and a correct test data corresponding to the test input data. Each of the plurality of teacher input data may be input to a teacher neural network to obtain a soft label output. The obtaining section 110 may obtain other data necessary for operation of the apparatus 10.

The teacher training section 120 may train the plurality of teacher neural networks using the training data. In an embodiment, the teacher training section 120 may train two or more different types of teacher neural networks.

The selecting section 130 may select a teacher neural network among a plurality of teacher neural networks for outputting a soft label output. In an embodiment, the selecting section 130 may randomly select a teacher neural network among the plurality of teacher neural networks. In an embodiment, the selecting section 130 may select a teacher neural network based on an accuracy of the plurality of teacher neural networks.

The processing section 140 may process calculations of the teacher neural networks. For example, the processing section 140 may input a training input data, a test input data, or a teacher input data (which may be hereinafter collectively referred to as "input data") into the teacher neural network and calculate a corresponding output from the neural network.

In an embodiment, the processing section 140 may input at least one teacher input data to the teacher neural network selected by the selecting section 130 to obtain a soft label output generated by the selected teacher neural network. The processing section 140 may also evaluate the plurality of teacher neural networks.

The student training section 150 may train a student neural network. The student training section 150 may train the student neural network with at least the teacher input data and the soft label output generated by the selected teacher neural network. In an embodiment, the student training section 150 may use a plurality of teacher input data and a plurality of soft label outputs generated by the plurality of teacher neural networks, by switching the teacher neural networks per each teacher input data.

The providing section 160 may provide the student neural network trained by the student training section 150 to an external device. In an embodiment, the external device has less computational resources than the apparatus 10. For example, the apparatus 10 may be a server computer having plentiful computational power, while the external device may be a small portable device such as a mobile phone, a mobile computer, a smart phone, a smart watch, a smart speaker, and/or other smart device.

Figure 2:
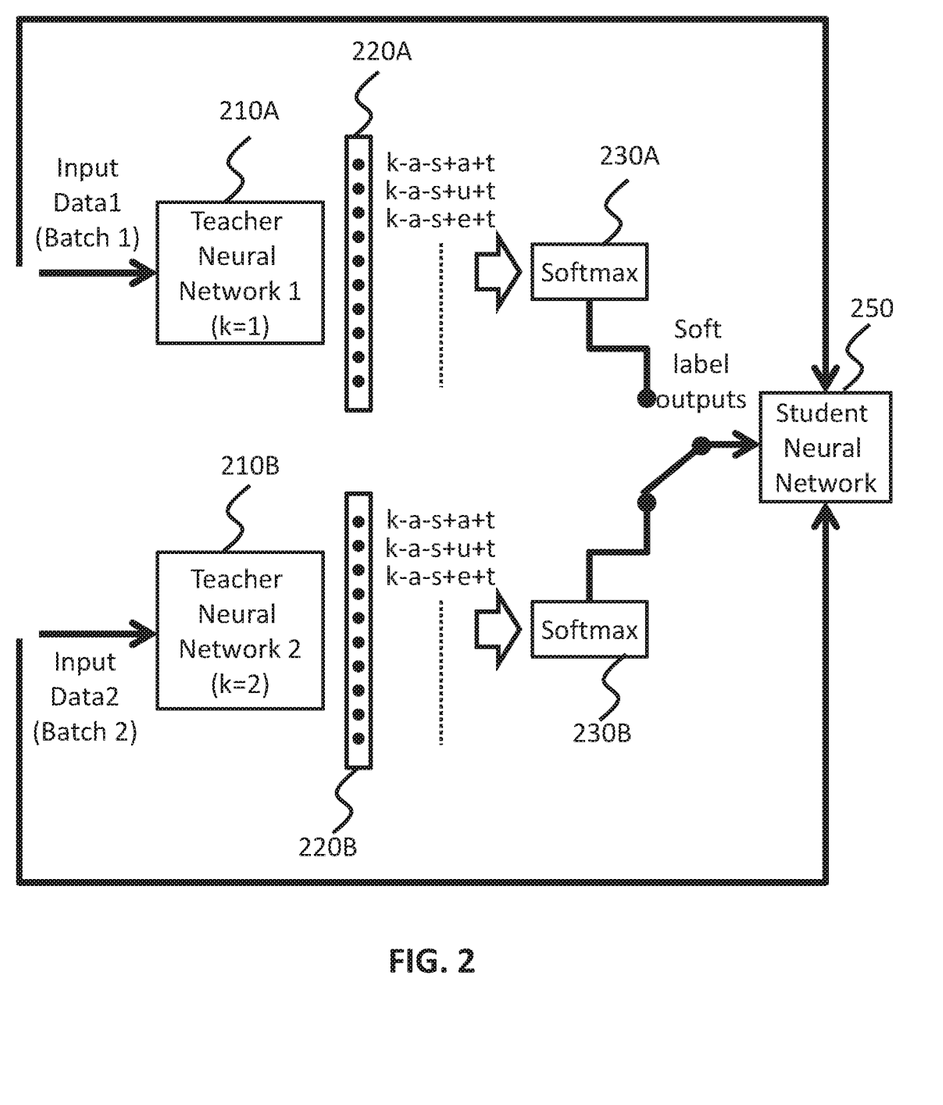
FIG. 2 shows an exemplary framework according to an embodiment of the present invention.

FIG. 2 shows an exemplary framework, according to an embodiment of the present invention. In a specific embodiment, the teacher neural networks and the student neural networks may receive audio data as the input data and output a classification of the audio data as the soft label output.

In the embodiment of FIG. 2, one teacher neural network 1 (shown as 210A) receives "input data 1" and another teacher neural network 2 (shown as 210B) receives "input data 2." Input data 1 and input data 2 may be audio data of human speech sampled at a certain sampling frequency. The audio data may be raw audio data that is not processed, or a feature vector derived from the raw audio data (such as logMel feature vector, mel-frequency cepstrum coefficient (MFCC) feature vector, etc.). Input data 1 and input data 2 may be different audio data, for example, derived from different portions of the same speech.

In other words, input data 1 and 2 may be different batches. For example, input data 1 may be the first, third, or fifth instance of 256 frames of the audio data of a speech of a person, and input data 2 may be second, fourth, or sixth instance of 256 frames of the audio data of the speech.

The teacher neural network 1 may receive "input data 1" as a teacher input data, and output a soft label output corresponding to the input data 1 from its output layer (shown as 220A). The soft label output may be a classification of the audio data identifying phonemes.

In the embodiment, the soft label output includes possibilities of phonemes such as "k-a-s+a+t", "k-a-s+u+t", "k-a-s+e+t" . . . . For example, if a soft label output from the teacher neural network 1 is a vector including 0.1, 5.1, 2.4, . . . , the soft label output may indicate that a possibility that sound of the input data 1 represents "k-a-s+a+t" is proportional to 0.1, a possibility that sound of the input data 1 represents "k-a-s+u+t" is proportional to 5.1, a possibility that sound of the input data 1 represents "k-a-s+e+t" is proportional to 2.4, etc.

The soft label output generated by the output layer 220A may be normalized by a softmax layer (shown as 230A) to output the normalized soft label output. The normalized soft label output may be a vector having values of which the sum is 1.

Similarly, the teacher neural network 2 may receive "input data 2" as a teacher input data, and output a soft label output corresponding to the input data 2 from its output layer (shown as 220B). The soft label output generated by the output layer 220B may be normalized by a softmax layer (shown as 230B) to output the normalized soft label output.

When a selecting section, such as the selecting section 130, selects the teacher neural network 1, a student training section, such as the student training section 150, may train a student neural network (shown as 250) with a pair of input data 1 and the normalized soft label output generated by the softmax layer 230A.

When the selecting section 130 selects the teacher neural network 2, the student training section 150 may train the student neural network 250 with a pair of input data 2 and the normalized soft label output generated by the softmax layer 230B. Thereby, the selecting section 130 may be regarded as switching the teacher neural networks 210A, 210B used for training the student neural network 250. Hereinafter the term "soft label output" may include both a normalized and a non-normalized soft label output.

Figure 3:
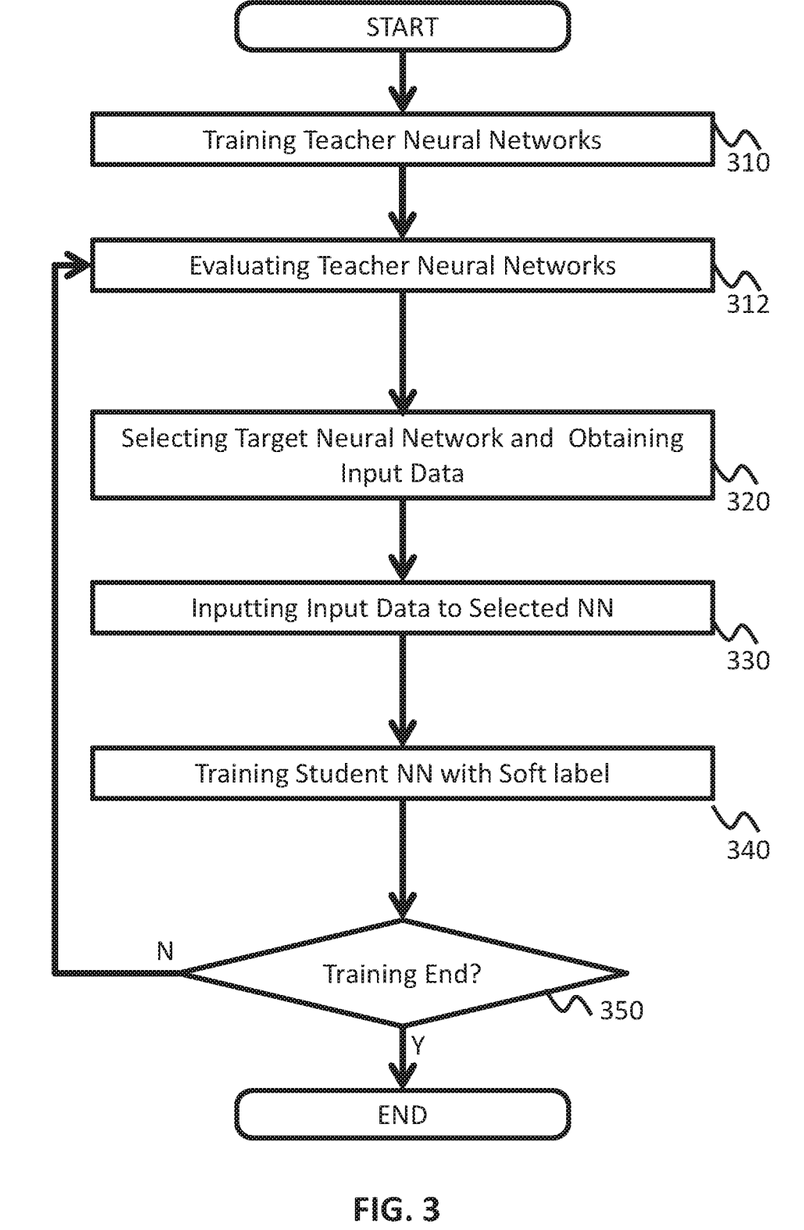
FIG. 3 shows an operational flow according to an embodiment of the present invention.

FIG. 3 shows an operational flow according to an embodiment of the present invention. The present embodiment describes an example in which an apparatus, such as the apparatus 10, performs operations represented by block 310 to block 350, as shown in FIG. 3 to train a student neural network.

At block 310, a teacher training section, such as the teacher training section 120, may train a plurality of teacher neural networks. The training section may train a plurality of types of teacher neural networks. For example, the training section may train teacher neural networks that have different structures, different layers, different nodes, etc. In an embodiment, the plurality of teacher neural networks may include two or more of: Convolutional Neural Networks (CNN), Visual Geometry Group (VGG) networks, and Long short-term memory (LSTM) networks.

The teacher training section, at block 310, may train the teacher neural networks using the training data. In an embodiment, the teacher training section, at block 310, may train each teacher neural network in an effort to minimize errors between correct training data and soft label outputs generated by the teacher neural network that inputs the training input data corresponding to the correct training data.

In a specific embodiment, during the training of a teacher neural network at block 310, the teacher training section may repeat iterations, wherein each iteration includes: inputting the input data into the teacher neural network, comparing an output data (e.g., a soft label output) of the teacher neural network with the corresponding correct training data, and adjusting a plurality of weights between nodes in the teacher neural network based on the comparison. The teacher training section may perform the adjusting by known computer-implemented methods, such as back propagation.

At block 312, a processing section, such as the processing section 140, may evaluate the plurality of teacher neural networks. The processing section may evaluate an accuracy of each of the plurality of teacher neural networks, at block 312, using test data.

The processing section, at block 312, may input each of a plurality of test input data of the test data into each teacher neural network, perform calculation of the each neural network, and calculate each of a plurality of outputs of each teacher neural network, such as soft label outputs. The processing section, at block 312, may evaluate an accuracy of a soft label output in comparison with a correct test data corresponding to the test input data of the test data.

In another embodiment, the processing section may evaluate average word error rate (or WER) of each teacher neural network, at block 312, by referring to a plurality of correct test data of the test data.

In another embodiment, the processing section, at block 312, may evaluate the proximity of soft label outputs generated by each teacher neural network to corresponding correct test data of the test data, to determine the accuracy of the teacher neural network. For example, the processing section, at block 312, may calculate an average distance between vectors representing the soft label outputs, and vectors representing the plurality of correct test data as representative of the accuracy.

After the operation at block 312, the apparatus may repeat iterations, each of which includes operations performed at block 320-block 350. Thereby the apparatus may repeat block 320, block 330 and block 340.

At block 320, a selecting section, such as the selecting section 130, may select a teacher neural network among a plurality of teacher neural networks for outputting a soft label output. In an embodiment, the selecting section, at block 320, may randomly select a teacher neural network among the plurality of teacher neural networks.

In another embodiment, the selecting section, at block 320, may select a teacher neural network among the plurality of teacher neural networks in a predetermined order (for example, an ascending order shown as Teacher Neural Network (or TNN) 1, TNN2, TNN3, TNN1, TNN2, TNN3, TNN1, TNN2, TNN3 . . . ).

In addition to the random or ordered selection, the selecting section, at block 320, may select a teacher neural network based on the accuracy evaluated at block 312. In an embodiment, the selecting section, at block 320, may increase the frequency of iterations where selecting a teacher neural network is based on an accuracy of a soft label output in comparison with a correct data corresponding to the input data, versus the frequency of iterations where selecting a teacher neural network is random, as the number of iterations increases.

In another embodiment, as iterations of block 320-block 350 progress, the selecting section may tend to select a teacher neural network that has a higher accuracy among the plurality of teacher neural networks, at block 320. The selecting section may first set probabilities, at block 320, for selecting each teacher neural network even (such as 100%/(the number of the teachers)), and then gradually adjust a probability for selecting each teacher neural network based on an accuracy of the teacher neural network. Thereby, more accurate teacher neural networks become more frequently selected, at block 320, than less accurate teacher neural networks, as iterations are repeated.

In an embodiment, the selecting section, at block 320, may select a teacher neural network that outputs a soft label output that is the closest to the correct data corresponding to the input data (which may be referred to as "best teacher neural network"), among the plurality of teacher neural networks at least one time during the iterations. Thereby the selecting section may improve an accuracy of the student neural network. In a specific embodiment, the selecting section, at block 320, may select the best teacher neural network in at least the last iteration.

At block 330, the processing section may input a teacher input data to the teacher neural network selected at the most recent iteration of block 320, and calculate a soft label output generated by the selected teacher neural network. The teacher input data may be a portion (e.g., 256 frames) of audio data. The teacher input data may be different from or the same as one of the training input data of the training data or the test input data of the test data.

The processing section, at block 330, may use different teacher input data during each of the iterations. In an embodiment, the processing section, at block 330, may use the first instance of 256 frames of audio data in the first iteration, the second instance of 256 frames of audio data in the second iteration, the third instance of 256 frames of audio data in the third iteration, and so on.

Figure 4:
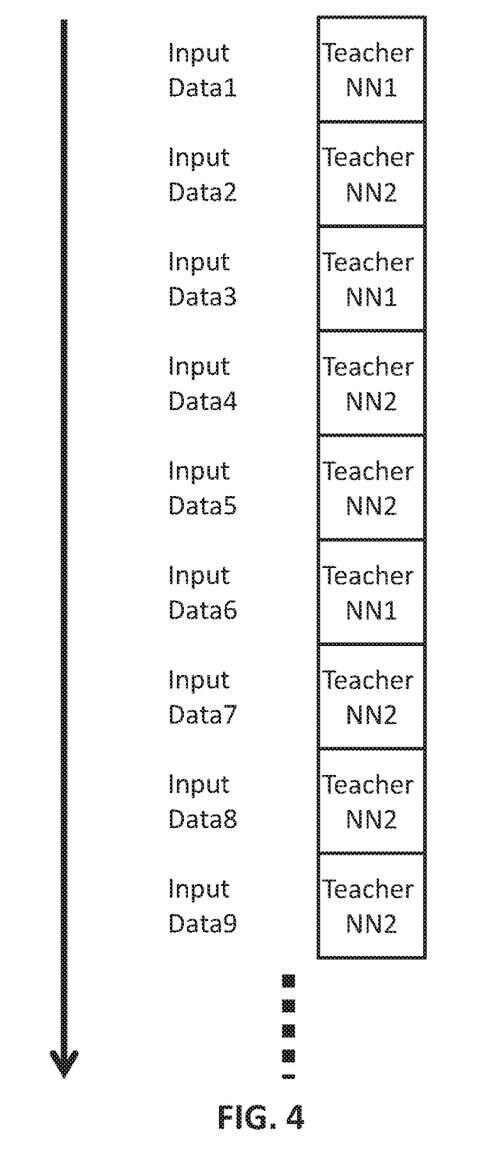
FIG. 4 shows input data and selected teachers during iterations according to an embodiment of the present invention.

FIG. 4 shows input data and selected teachers during iterations according to an embodiment of the present invention. In an embodiment of FIG. 4, two teacher neural networks: Teacher NN1 and Teacher NN2 (such as the teacher neural networks 210A and 210B in FIG. 2) are trained at block 310. In the embodiment, Teacher NN2 is evaluated as more accurate than Teacher NN1 at block 312. In an embodiment, Teacher NN1 may be a Long-short term memory (LSTM) that has 4 bidirectional LSTM layers with 512 units per direction and a linear bottleneck layer with 256 units. Teacher NN2 may be a VGG that has 10 convolutional layers, a max pooling layer inserted after every 3 convolutional layers, and followed by 4 fully connected layers.

In the embodiment, the selecting section first selects Teacher NN1 at block 320, and the processing section inputs the first teacher input data (shown as Input Data 1), at block 330, into Teacher NN1 at the first iteration. The selecting section selects Teacher NN2 at block 320, and the processing section inputs the second teacher input data (shown as Input Data 2), at block 330, into Teacher NN1 at the second iteration. Then, the selecting section, at block 320, selects Teacher NN1, NN2, NN2, NN1, NN2, NN2, and NN2, and the processing section, at block 330, inputs the third-through-ninth teacher input data (shown as Input Data 3-Input Data 9) into the corresponding selected teacher neural network at the third-through-ninth iterations.

As shown in the embodiment of FIG. 4, the selecting section may gradually tend to more frequently select more accurate teacher neural networks (e.g., Teacher NN2) than less accurate teacher neural network, at block 320, as iterations progress. During the iterations, the processing section may input different input data (e.g., Input Data 1-9), at block 330, into the teacher neural networks.

At block 340, a student training section may train a student neural network with a teacher input data and the corresponding soft label output obtained at the most recent iteration of block 330. For example, in the embodiment of FIG. 4, at the first iteration, the student training section may train the student neural network, at block 340, with Input Data 1 and a soft label output that the Teacher NN1 has output in response to receiving Input Data 1. In an embodiment, the student training section, at block 340, may train the student neural network such that soft label errors between (1) a soft label output generated by the student neural network in response to receiving the teacher input data (e.g., Input Data 1) and (2) the soft label output generated by the selected teacher neural network (e.g., Teacher NN1) in response to receiving the same teacher input data, is minimized.

In a specific embodiment, the student training section may repeat iterations at block 340, wherein each iteration includes: inputting the teacher input data into the student neural network, comparing an output data (e.g., soft label output) of the student neural network with the soft label output from the teacher neural network, and adjusting a plurality of weights in the student neural network based on the comparison. The student training section may perform the adjusting, at block 340, by known computer-implemented methods such as back propagation.

For example, at block 340 the student training section may determine θ such that L(θ) is minimized. L(θ) is defined by the following formula:

$$L(\theta) = -\Sigma_i q_i \log p_i,$$

where θ represents the student neural network including weights between nodes and trainable parameters of the student neural network, i represents an index of nodes in the output layer of the student neural network and the teacher neural networks, $q_i$ represents a value of i-th index in the soft label output output from the selected teacher neural network, and $p_i$ represents an output probability of the i-th class (e.g., the i-th index in a soft label output) output from the student neural network.

The student training section may train the student neural network, at block 340, with both of soft label outputs and hard labels. In an embodiment, the student training section may train the student neural network, at block 340, with at least a correct test data corresponding to the input data in addition to the teacher input data and the soft label output output from the selected teacher neural network. In the embodiment, the student training section may train the student neural network, at block 340, such that a sum of (A) the foregoing soft label errors and (B) hard label errors between (1) a soft label output generated by the student neural network in response to receiving the teacher input data (e.g., Input Data 1) and (2) the teacher correct data, is minimized.

In an embodiment, the student neural network, at block 340, may be smaller than the plurality of neural networks, such as having a small number of nodes and/or layers than the plurality of teacher neural networks. For example, the student neural network, at block 340, may be a compact convolutional neural network (CNN) that has 2 convolutional layers with 64 and 128 hidden nodes each, 2 fully connected layers with 768 hidden units per layer, and a 256 hidden-unit bottleneck layer.

At block 350, the selecting section may determine whether to continue the training of the student neural network. At block 350, the selecting section may go back to the operation performed at block 320 to begin a new iteration starting with selecting a new teacher neural network. Alternatively, the selecting section may determine, at block 350, to end the training, in which case the selecting section may end the training of the student neural network.

In an embodiment, the selecting section may determine to end the training, at block 350, when all or a predetermined amount of teacher input data is used for the training of the student neural network.

As explained above, the apparatus trains a plurality of teacher neural networks, and then repeatedly selects a teacher neural network and trains a student neural network with a soft label output generated by the selected teacher neural network. In general, significant computational resources (such as calculation power, memory, etc.) are needed for implementing accurate neural networks. On the other hand, according to the foregoing embodiments, the apparatus may train a student neural network to have similar characteristics and accuracy as teacher neural networks without requiring the same amount of computational resources as the teacher neural networks.

In addition, the apparatus may switch the teacher neural networks rather than combine them. Thereby, the apparatus may not need to tune interpolation weights between the teacher neural networks.

In some embodiments, the teacher neural networks may input privileged data in addition to the input data for outputting the soft label output. For example, the teacher training section may train the teacher neural networks with the privileged data in addition to the training input data at block 310, and the processing section may input the privileged data in addition to the teacher input data at block 330. The privileged data may include at least one of information about the speaker (such as gender, age, body information, a native language, etc.) associated with an audio sample.

In some embodiments, the student training section may, at block 340, additionally train a student neural network that has been trained by switched teacher neural networks, with a hard label. In the embodiments, the student neural network, at block 340, may train the student neural network with the training data including one or more pairs of a training input data and a correct training data after the iterations of block 320-block 350.

Figure 5:
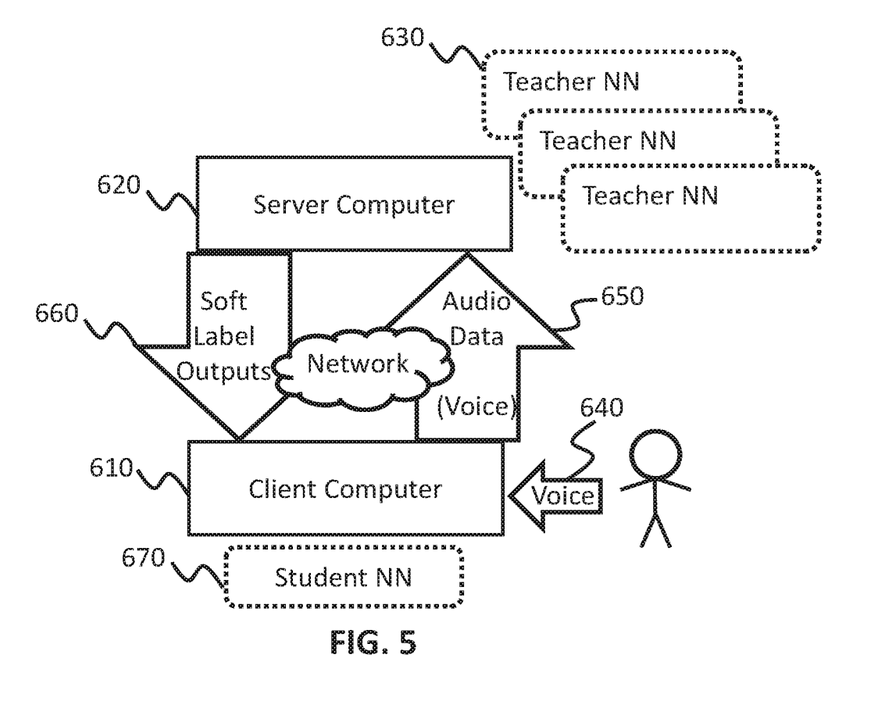
FIG. 5 shows a client-server environment according to an embodiment of the present invention.

FIG. 5 shows a client-server environment according to an embodiment of the present invention. In an embodiment of FIG. 5, an apparatus, such as the apparatus 10, may be implemented by at least computers, such as a client computer 610 and a server computer 620.

The client computer may be a smart device such as a smart speaker. In an embodiment, the server computer 620 may include at least the teacher training section 120, the selecting section 130, and the processing section 140. The client computer 610 may include at least the student training section 150.

The server computer 620 may first train a plurality of teacher neural networks 630 (shown as the multiple instances of Teacher NN) before selecting a teacher neural network. Then the client computer 610 may obtain audio data 640 of a speech from a person (typically a user of the client computer 610) as teacher input data. Then the client computer 610 may transmit the teacher input data 650 to the server computer 620.

The server computer 620 may receive the teacher input data 650 from the client computer 610. The server computer 620 may select the teacher neural network among the plurality of teacher neural networks 630. The server computer 620 may input the teacher input data 650 to the selected teacher neural network to obtain the soft label output 660 generated by the selected teacher neural network 630.

Then, the server computer 620 may transmit the soft label output 660 to the client computer 610. The client computer 610 may train the student neural networks 670 with at least the teacher input data 650 and the soft label output 660 generated by the selected teacher neural network 630.

According to the embodiment of FIG. 5, the training of the teacher neural networks 630, which may need significant computational resources, is performed by the server computer 620, while the training of the student neural network 670, which may need significantly less computational resources, is performed by the client computer 610 in real time. In the embodiment, the server computer 620 may preliminarily train the student neural network 670, and provide the client computer 610 with the trained student neural network 670. Then, the client computer 610 may update the student neural network 670 in real time.

The embodiments where the neural networks represent acoustic models and classify the audio data are mainly explained above. However, the teacher neural networks 630 and student neural networks 670 may have other types of functions. For example, the teacher neural networks 630 and student neural networks 670 may represent other types of models such as language models, image recognition models, meteorological models, economical models, etc.

Figure 6:
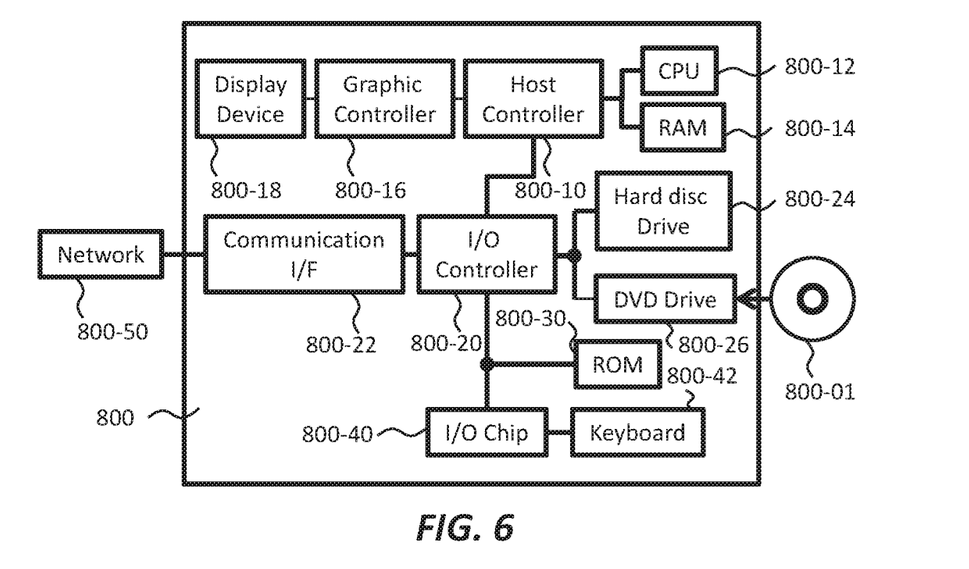
FIG. 6 shows an exemplary hardware configuration of a computer that functions as a system, according to an embodiment of the present invention.

FIG. 6 shows an exemplary hardware configuration of a computer configured for the training of the student neural network with the plurality of teacher neural networks, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention. The apparatus of the embodiments of the present invention may include the computer readable medium and the processor or programmable circuitry operable to execute the instructions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable to train the student neural network by switching the plurality of teacher neural networks.

What is claimed is:

1. A computer-implemented method comprising:
   selecting a teacher neural network among a plurality of teacher neural networks,
   inputting at least an input data to the selected teacher neural network to obtain a soft label output generated by the selected teacher neural network,
   training a student neural network with at least the input data and the soft label output generated by the selected teacher neural network,
   increasing a frequency of selecting the teacher neural network based on an accuracy of the soft label output in comparison with the correct data corresponding to the input data versus a frequency of iterations in which selecting the teacher neural network is random, as a number of the iterations increases,
   repeating selecting the teacher neural network, inputting the input data to the selected teacher neural network, and training the student neural network.

2. The method of claim 1, wherein selecting the teacher neural network among the plurality of teacher neural networks includes:
   randomly selecting the teacher neural network among the plurality of teacher neural networks.

3. The method of claim 1, wherein selecting the teacher neural network among the plurality of teacher neural networks includes:
   selecting the teacher neural network that outputs the soft label output that is a closest to the correct data corresponding to the input data, among the plurality of teacher neural networks.

4. The method of claim 1, wherein the input data is audio data and the soft label output is a classification of the audio data.

5. The method of claim 4, wherein the classification of the audio data identifies phonemes.

6. The method of claim 1, wherein training the student neural network with at least the input data and the soft label output generated by the selected teacher neural network includes:
   training the student neural network with at least the input data, the soft label output generated by the selected teacher neural network, and a correct data corresponding to the input data.

7. The method of claim 1, further comprising:
   before selecting the teacher neural network, training the plurality of teacher neural networks by a server computer,
   wherein selecting the teacher neural network among the plurality of teacher neural networks includes:
      receiving, by the server computer, the input data from a client computer, and
      selecting, by the server computer, the teacher neural network among the plurality of teacher neural networks,
   wherein inputting an input data to the selected teacher neural network to obtain the soft label output generated by the selected teacher neural network includes:
      inputting, by the server computer, the input data to the selected teacher neural network to obtain the soft label output output from the selected teacher neural network, and
      transmitting, by the server computer, the soft label output to the client computer,
   wherein training the student neural network with at least the input data and the soft label output generated by the selected teacher neural network includes:
      training, by the client computer, the student neural networks with at least the input data and the soft label output generated by the selected teacher neural network.

8. An apparatus comprising:
   a processor or a programmable circuitry; and
   one or more computer readable mediums collectively including instructions that, when executed by the processor or the programmable circuitry, cause the processor or the programmable circuitry to perform operations including:
      selecting a teacher neural network among a plurality of teacher neural networks,
      inputting at least an input data to the selected teacher neural network to obtain a soft label output generated by the selected teacher neural network,
      training a student neural network with at least the input data and the soft label output generated by the selected teacher neural network,
      increasing a frequency of selecting the teacher neural network based on an accuracy of the soft label output in comparison with the correct data corresponding to the input data versus a frequency of iterations in which selecting the teacher neural network is random, as a number of iterations increases, and
      repeating selecting the teacher neural network, inputting the input data to the selected teacher neural network, and training the student neural network.

9. The apparatus of claim 8, wherein selecting the teacher neural network among the plurality of teacher neural networks includes:
   randomly selecting the teacher neural network among the plurality of teacher neural networks.

10. The apparatus of claim 8, wherein selecting the teacher neural network among the plurality of teacher neural networks includes:
   selecting the teacher neural network that outputs the soft label output that is a closest to the correct data corresponding to the input data, among the plurality of teacher neural networks.

11. The apparatus of claim 8, wherein the input data is audio data and the soft label output is a classification of the audio data.

12. A computer program product including one or more computer readable storage mediums collectively storing program instructions that are executable by a processor or programmable circuitry to cause the processor or programmable circuitry to perform operations comprising:
   selecting a teacher neural network among a plurality of teacher neural networks,
   inputting at least an input data to the selected teacher neural network to obtain a soft label output generated by the selected teacher neural network,
   training a student neural network with at least the input data and the soft label output generated by the selected teacher neural network,
   increasing a frequency of selecting the teacher neural network based on an accuracy of the soft label output in comparison with the correct data corresponding to the input data versus a frequency of iterations in which selecting the teacher neural network is random, as a number of iterations increases, and
   repeating selecting the teacher neural network, inputting the input data to the selected teacher neural network, and training the student neural network.

13. The computer program product of claim 12, wherein selecting the teacher neural network among the plurality of teacher neural networks includes:
   randomly selecting the teacher neural network among the plurality of teacher neural networks.

14. The computer program product of claim 12, wherein the selecting the teacher neural network among the plurality of teacher neural networks includes:
   selecting the teacher neural network that outputs the soft label output that is a closest to the correct data corresponding to the input data, among the plurality of teacher neural networks.

* * * * *